Aug. 2, 1966 S. A. AGNEW 3,264,447
PENETRATION CONTROL FOR ARC WELDING
Filed Jan. 29, 1965 3 Sheets-Sheet 1
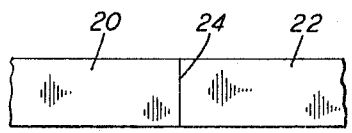
FIG. 1
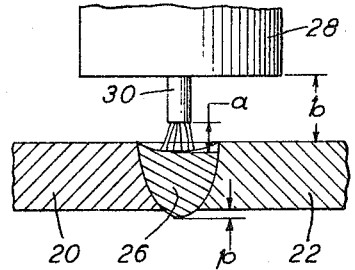
FIG. 2
FIG. 3
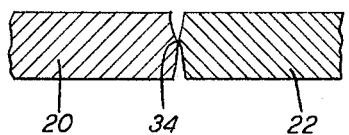
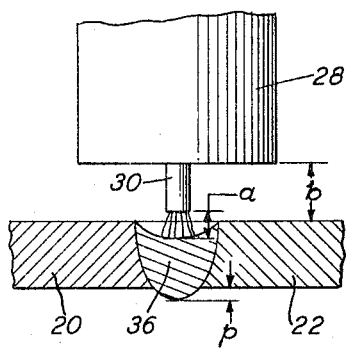
FIG. 4
FIG. 5
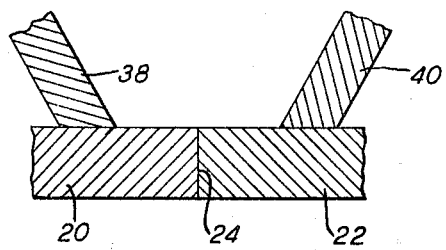
FIG. 6
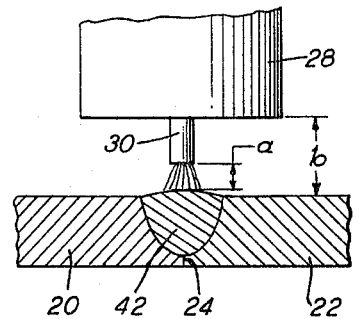
INVENTOR
STANLEY A. AGNEW
BY Edmund W Bopp
AGENT Aug. 2, 1966  S. A. AGNEW  3,264,447
PENETRATION CONTROL FOR ARC WELDING
Filed Jan. 29, 1965  3 Sheets-Sheet 2

INVENTOR
STANLEY A. AGNEW
BY
Edmund W. Bopp
AGENT

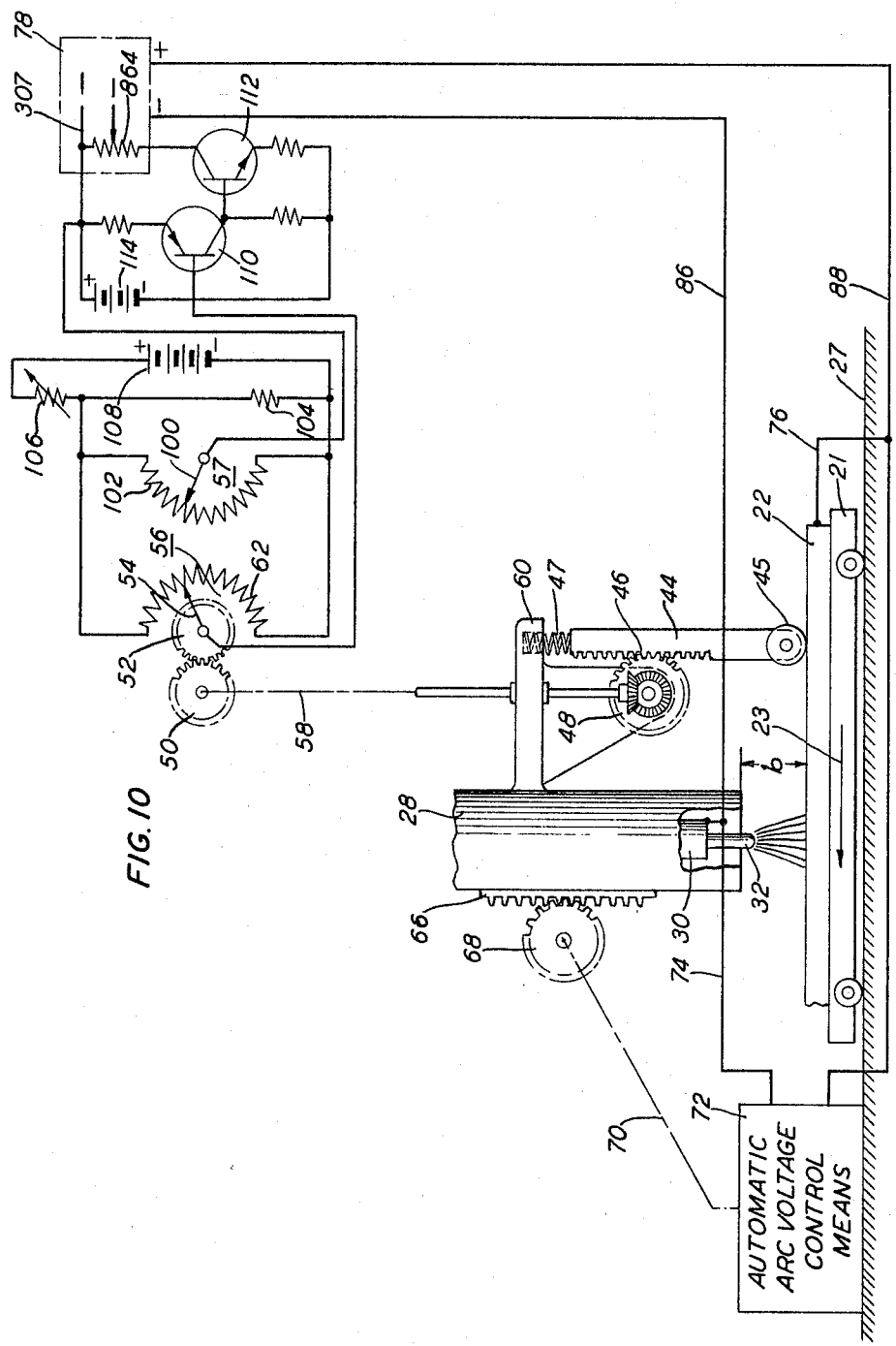

United States Patent Office 3,264,447
Patented August 2, 1966.

3,264,447
PENETRATION CONTROL FOR ARC WELDING
Stanley A. Agnew, New Providence, N.J., assignor to Air Reduction Company, Incorporated, New York, N.Y., a corporation of New York
Filed Jan. 29, 1965, Ser. No. 429,049
12 Claims. (Cl. 219—130)

My invention relates to electric arc welding, and more particularly to automatic means for maintaining a constant depth of penetration of the weld into the work under varying circumstances existing at or near the location of the juncture of parts to be welded.

It has been customary in welding a seam to regulate the welding current to a substantially constant value designed to provide a constant depth of penetration of the weld into the work along the length of the seam. In addition, to accommodate minor surface variations in the workpiece, as well as to promote uniformity of welding along the seam, an automatic control of the arc voltage is provided whereby when the arc length tends to increase causing the arc voltage to increase, means usually automatic are immediately actuated to move the arc electrode tip closer to the work thereby tending to continuously maintain both the arc length and the arc voltage close to the original values. Conversely, when the arc length tends to decrease, causing the arc voltage to decrease, the same means are immediately actuated to move the arc electrode tip further away from the work, again tending to continuously maintain the arc length and are voltage close to the original values.

Any automatic arc voltage control has an inherent and serious deficiency relative to the desired maintenance of uniform penetration, because arc voltage and penetration do not refer to the same origin of reference measurement on the work. Arc voltage measurements are referred to the surface of the molten pool whereas penetration measurements refer to the unfused surface of the work. Under ideal and perfectly uniform work parameters, once equilibrium of all conditions has been reached, some time after welding has commenced, these two datums of reference are more or less equivalent. However, ideal and uniform work parameters are rarely, if ever, achieved and it is strongly desired to ensure uniform penetration in as short a time as possible after welding commences.

The work parameter of heat sink may be used as an example. Heat sink may be defined as the ability of the work, and any items in thermal contact with the work, to withdraw heat from the weld zone. As the weld commences, the surface of the molten pool is high on the work relative to the unfused work surface and penetration is shallow. As welding continues, the work heats up, due to heat transfer ahead of the arc, and the surface of the molten pool sinks into the work, relative to the work surface, and penetration increases. At some time after arc start, thermal equilibrium is achieved and penetration would remain constant provided the work parameters would also remain constant. This, however, is rarely the case. If at any time the heat sink becomes less effective, penetration increases and the surface of the molten pool sinks even further into the work. The response of the automatic voltage control is the opposite of that desired in that the tip of the electrode follows the surface of the molten metal and further increases the penetration. If this happens, for example, while full penetration is being achieved under proper conditions, the voltage control senses the beginning of a "burn-through" condition and by increasing the penetration, undesirably acts to promote ultimate fall-through of the molten metal and loss of the weld.

Conversely, if the heat sink becomes more effective, penetration decreases and the surface of the molten pool rises relative to the work. The response of the voltage control is again the opposite of that desired, in that the tip of the electrode follows the surface of the molten pool upward and so further decreases the penetration.

A feature of the automatic voltage control that is made to serve the purposes of the present invention is that the voltage control reliably and consistently senses any changes in the work conditions, whether the change be unintentional or designed, for example, due to a change in work geometry. The sensed change is utilized with favorable result even though the response of the voltage control per se, to the sensed change, is in the wrong direction.

There are various specific circumstances which can cause variations in the depth of penetration of the weld when operating with nominally constant welding current and with automatic arc voltage control. One such circumstance is the degree of excellence of fit between the abutting plates to be welded. If the depth of penetration is correct in regions where the plates actually touch each other, the depth of penetration will be greater than desired in regions where the plates do not touch and the depth of penetration will vary from point to point with the actual spacing of the plates. Another specific cause of variation in depth of penetration is the presence of holding clamps, heat absorbing backup plates, or other heat absorbing masses of material touching or adjacent to the plates near the seam. The depth of penetration will vary inversely with the rate of heat flow into the heat sinks constituted by the heat absorbing materials. Still another cause of variation in depth of penetration is a variation in line voltage impressed upon the welding power supply source, causing a variation in welding current. This latter effect is, however, usually compensated within the welding power supply source.

An object of the invention is to effect automatic control of the depth of penetration of a weld.

A related object is to offset the effects of various causes which tend to vary the depth of penetration of a weld at various regions along the length of a seam.

A further object is to regulate an automatic welding device to produce a fused seam which is of uniform configuration throughout its length.

A further object is to produce a seam between abutting plates, which seam is slightly concave at the arc surface, meaning the surface upon which the arc has played, and slightly convex at the opposite surface, thereby penetrating entirely through the plates, and uniformly so at all points along the length of the seam. The concavity of the arc surface may be adjusted or made convex by the addition of filler material. In the case wherein only partial penetration is desired, the arc surface of the seam will be slightly convex.

A further object is to produce a fused seam of uniform configuration despite variations in the heat sink due to variations in work geometry or tooling means.

A further object is to produce an appropriately fused seam despite variations in heat sink due to changes in work thickness.

To achieve these and other objects, the invention utilizes the ability of the automatic voltage control to correctly sense changes in work parameters, more particularly heat sink, to cause proportionately corresponding changes in heat input to maintain penetration within close limits. To this end, I provide means for continuously sensing or measuring the spacing between a fixed point on the welding head or on the electrode holder and the normal or unfused surface of the work. I utilize variations in this spacing to actuate means to vary the welding current in direct relationship to the variations in said spacing; that is, in such sense as to increase the welding current when the sensed spacing increases and to decrease the welding current when the sensed spacing decreases, thereby tending to maintain constant the depth of penetration of the weld to maintain constant the depth of penetration of the weld into or through the work. I therefore term my invention a proximity penetration control.

In case the welding electrode is of the substantially nonconsumable type, the point fixed with reference to the welding head or with reference to the electrode holder may be the tip of the welding electrode at the arc, or in fact any point on the welding electrode.

I prefer to locate the sensing device for measuring the spacing at a point reasonably close to the arc in order to reduce the effect of irregularities in the surface which is being sensed, and also in order to accommodate curved plates used in the construction of cylindrical tanks or the like.

Other features, objects and advantages will appear from the following more detailed description of an illustrative embodiment of the invention, which will now be given in conjunction with the accompanying drawings.

In the drawings:

FIGURE 1 is a diagrammatical elevational view of a pair of plates of substantially equal thickness meeting at a well fitting butt joint;

FIGURE 2 is a diagrammatical representation, in elevational view and partly in section showing a portion of a welding head in relation to an optimum form of weld which penetrates a satisfactory amount through plates abutting as shown in FIGURE 1;

FIGURE 3 is a diagrammatical sectional view of a pair of plates of substantially equal thickness meeting in a poorly fitting butt joint;

FIGURE 4 is a representation similar to that of FIGURE 2 showing a weld exhibiting excessive depth of penetration through plates abutting as shown in FIGURE 3;

FIGURE 5 is a diagrammatical sectional view of a pair of plates of substantially equal thickness meeting in a well fitting butt joint and held in place by clamping means which serve as heat sinks;

FIGURE 6 is representation similar to that of FIGURE 2 showing a weld exhibiting insufficient penetration through plates held in place by heat absorbing clamps as shown in FIGURE 5;

FIGURE 10 is a schematic diagram of an embodiment of the invention;

Figure 7:
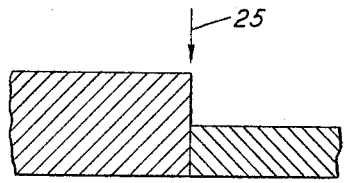
FIGURE 7 is a diagrammatical sectional view of a pair of plates of unequal thicknesses meeting at a butt joint.

Referring to FIGURE 1, plates 20 and 22 of substantially equal thickness are shown meeting in a butt joint, the plates abutting with a good fit along the line 24.

FIGURE 2 shows in cross section a preferred form of weld 26 between the well fitted plates 20, 22. The weld is shown in a state immediately before solidification. As shown, the preferred shape is slightly concave at the top surface and protrudes slightly at the bottom, with the usual gradual narrowing from top to bottom as determined by the heat penetration from the top into the material of the plates. The barrel of the welding head is shown diagrammatically at 28, the electrode contact sleeve at 30 and the electrode at 32. The arc length is indicated by $a$, being the spacing between the tip of the electrode and the upper surface of the molten material of the weld pool. The spacing between a fixed point on the welding head and the upper unfused surface of the plate 22 is indicated by $b$. The depth of penetration is arbitrarily designated by $p$, the spacing between the lowermost projection of the weld 26 and the lower surface of the plate 22.

The depth of penetration may of course be designated in other ways, for example as the spacing between the upper surface of the plate 22 and the lower extremity of the weld, whether the latter is within the work or protrubes below the lower surface of the plate 22.

FIGURE 3 shows the plates 20 and 22 in cross section at a place where the fit is poor, as indicated by the fact that the plates touch at a single point 34 with gaps on either side of this point. It will be evident that in some places where the fit is poor the plates will not touch at all.

FIGURE 4 shows in cross section the form of weld 36 to be expected at places where the fit is poor, as for example at the place shown in FIGURE 3. Due to the gaps between the plates 20 and 22, the penetration $p$ of the weld is greater than in FIGURE 2, the arc surface of the weld pool sagging considerably and the weld protruding further below the other surface of the plates. In the extreme case, the weight of the molten material in the weld 36 is sufficient to cause material to drop out of the seam. The lowering of the arc surface of the weld pool under the electrode 32 causes the automatic arc voltage control to move the electrode downward, maintaining constant the spacing $a$ while the spacing $b$ is decreased accordingly. In accordance with the invention, I utilize the decrease in the spacing $b$ to actuate means for decreasing the arc current, so that the heat applied to the arc is reduced and the depth of penetration is reduced, thereby tending to reduce to a minimum the actual resulting variation in penetration. It will be understood that the increased penetration shown in FIGURE 4 is exaggerated in order to aid in the explanation of the operation of the invention. In the practice of the invention, small changes in penetration are immediately counteracted by changes in arc current so that the accumulated change in penetration is kept relatively small.

FIGURE 5 shows the plates 20 and 22 at a place where there is a good fit along the line 24 but where there are clamping means 38, 40 in thermal contact with plates 20 and 22 respectively. The clamping means constitute heat sinks which draw heat away from the weld pool. In general, the clamping means will not be uniformly distributed along the length of the seam, being applied only at certain spaced points, so that the heat absorbing effect of the clamping means varies along the length of the seam. Similar variations in heat absorption will occur with the use of backup plates which are used with the definite purpose of absorbing heat from the weld, which absorption may vary in degree from point to point on account of variations in the degree of intimate thermal contact between the backup member and the workpiece. Similar effects will also occur where stiffening ribs are used or plates are welded into place or otherwise attached to the work prior to the given welding operation.

FIGURE 6 shows in cross section the form of weld 42 to be expected at the place shown in FIGURE 5. Here, the penetration is not sufficient to cause a protuberance of the weld 42 below the lower surfaces of the plates 20 and 22, being less than 100 percent of the thickness of the plates. The top surface of the weld pool may be less depressed as compared to the case of FIGURE 2, or may be flush with the top surfaces of the plates 20 and 22, or slightly raised, as shown in FIGURE 6. The raising of the top surface of the weld pool compared to the level shown in FIGURE 2, causes the automatic arc voltage control to raise the electrode, keeping the spacing $a$ constant. The result is an increase in the spacing $b$, which I utilize to cause an increase in the welding current which in turn increases the heat input into the arc and increases the penetration to offset the loss of heat to the heat sinks.

Figure 8:
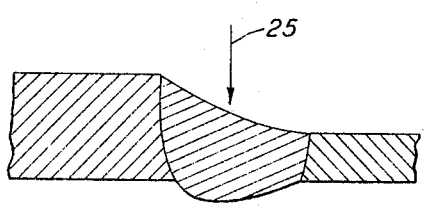
FIGURE 8 is a diagrammatical sectional view of a weld joining a pair of plates originally meeting as shown in FIGURE 7.
Figure 9:
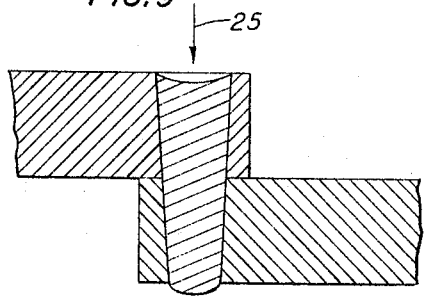
FIGURE 9 is a diagrammatical sectional view of a weld joining a pair of plates originally meeting in a lap joint.

FIGURES 7–9 show conditions holding in other types of joints to which the invention is applicable.

FIGURE 7 shows two plates of unequal thickness meeting in a butt joint. An arrow 25 shows the point of application of the arc electrode in effecting a weld at the butt joint.

FIGURE 8 shows a typical shape of a weld joining the plates shown in FIGURE 7 made by an electrode applied at the place indicated by the arrow 25, the weld preferably protruding somewhat below the bottom surfaces of the abutting plates and uniform along the weld length.

FIGURE 9 shows a typical shape of a weld joining a pair of plates in a lap joint as made by an electrode applied at the place indicated by the arrow 25. The weld is preferably slightly concave at the upper surface and protrudes slightly below the bottom surface of the bottom plate.

In the types of welds shown in FIGURES 8 and 9 it may be desired to maintain uniform penetration of the weld into or through the work from point to point along the seam.

FIGURE 10 shows in schematic representation an embodiment of the invention. The barrel 28, contact sleeve 30, and electrode 32 are shown in elevation above the plate 22. The spacing $b$ is indicated between the bottom of the barrel 28 and the unfused top surface of the plate 22, which plate is shown supported by a carriage 21 which may be moved in the direction of the arrow 23 although if desired the barrel and welding head may be arranged to be moved over a fixed workpiece. A spacing sensor in the form of a rod 44 is provided, resting upon the upper surface of the plate 22. The rod 44 may have a roller 45 bearing upon the plate and may be spring-biased toward the plate. The rod 44 is provided with a rack portion 46 which meshes with a spur gear or segment 48, in driven relationship with the rack 46. Another spur gear or segment 50 is provided in driving relationship to a spur gear or segment 52 in driving relationship in turn to the movable arm 54 of a potentiometer 56. The gear 50 is arranged to be driven by the gear 48 by means of a drive shaft 58 journaled in a bracket 60 supported upon the barrel 28. The potentiometer 56 has a winding or resistor element 62 which is arranged to be traversed by the arm 54 when the gear 52 is turned. The member 44 is maintained in continuous contact with the plate 22 during relative motion of the welding head and the plate 22, as by a compression spring 47 inserted between the bracket 60 and the member 44.

The roller 45 or member 44 is preferably located as close as may be to the arc taking into account the need for protecting the sensing device from the heat of the arc. The sensing member may be located either ahead or behind the arc, or at a side. In general, the placing of clamps may put restrictions on the side location. In an embodiment which has been built and successfully operated, the sensing device is located about six inches in front of the arc. When using the invention in connection with butt joints between plates of unequal thicknesses as illustrated in FIGURE 8 or with lap joints as illustrated in FIGURE 9, the sensing member may be made to bear on the top surface of either plate.

The barrel 28 has attached thereto a rack member 66 in driven relationship to a gear 68 mounted upon a drive shaft 70, which shaft is the mechanical output member of an automatic arc voltage control device 72. Any movement of the shaft 70 drives the barrel 28 up or down, thereby varying the spacing $b$, causing in turn a movement of the drive shaft 58 through the members 44, 46, and 48, thereby changing the setting of the arm 54 on the potentiometer conductor 62. It will be evident that means other than a potentiometer may be used with equivalent results in sensing variations in the spacing $b$.

The automatic arc voltage control device 72 may be of the type shown and described in United States Patent 2,832,000, issued April 22, 1958 to R. B. Steele, assigned to the same assignee as the present application. The shaft 70 in FIGURE 10 herein corresponds to the shaft 17 shown in FIGURE 1 of the Steele patent.

The control device 72 in FIGURE 10 is actuated by electrical input over a conductor 74 connected to the arc electrode contact sleeve 30 and a conductor 76 connected to the workpiece plate 22. These conductors impress the arc voltage upon the control device 72 in the same manner as unnumbered conductors in FIGURE 1 of the Steele patent impress the arc voltage across the resistor 72 in the Steele patent.

There is preferably provided, as shown, a second potentiometer 57, which may be similar in all respects to potentiometer 56, with a movable arm 100 and a winding or resistor element 102. The windings or resistor elements 62 and 102 are connected in parallel in a Wheatstone bridge formation across a resistor 104 of a voltage divider comprising resistors 104 and 106, which resistors are serially connected across a source of direct current shown as a battery 108.

A translating and amplifying circuit is provided, illustrated as employing two transistors 110 and 112, energized from a direct current source shown as a battery 114. The transistor 110 is shown as being of the PNP type with its emitter electrode connected through an emitter resistor to the positive terminal of the battery 114 and its collector electrode connected through a collector resistor to the negative terminal of the battery 114. The transistor 112 is shown as being of the NPN type with its collector electrode connected through a collector resistor to the positive terminal of the battery 114 and its emitter electrode connected through an emitter resistor to the negative terminal of the battery 114. The movable arm 100 of the potentiometer 57 is connected to the emitter electrode of the transistor 110 by way of the emitter resistor for that transistor and the movable arm 54 of the potentiometer 56 is connected to the base electrode of the transistor 110. The collector electrode of the transistor 110 is directly connected to the base electrode of the transistor 112.

The collector resistor of the transistor 112 forms the winding or resistor element of a current demand potentiometer 864 which is included as a part of a programmable power source 78, which source may, for example, be of the form shown and described in United States Patent 3,123,761, issued March 3, 1964, to William J. Greene, assigned to the same assignee as the present application. The power source of the Greene patent is capable of being operated as a programmable substantially constant current source, adjustable or programmable as to the current value. In FIGURE 3C of the Greene patent, the disclosure includes a current demand potentiometer 864. For the purposes of the present invention, the negative end of the potentiometer 864 of Greene is disconnected from the potentiometer 862 of Greene and is connected to the collector electrode of the transistor 112 as shown in FIGURE 10 of the present application. The positive end of the potentiometer 864 of Greene is left connected to the signal ground line 307 of Greene, which line is connected to the positive terminal of the battery 114 as shown in FIGURE 10 herein. The source 78 may be a direct current source, in which case the negative conductor 86 thereof is preferably connected to the sleeve 30 and the positive conductor 88 to the workpiece, shown as plate 22 in FIGURE 10. Alternatively, the source 78 may be an alternating current source in which case the current value will be controllable by means of a control member corresponding to potentiometer 864 and the conductors 86 and 88 will carry alternating current.

In the operation of the system shown in FIGURE 10, the welding power source 78 furnishes power to the electric arc circuit, preferably at a current value, determined initially by the setting of the potentiometer 864. The voltage across the arc is impressed also upon the automatic arc voltage control device 72. Any variation in the arc length $a$ is reflected in a corresponding proportional variation in the arc voltage. The arc voltage variation actuates the control device 72 to turn the drive shaft 70 to maintain the arc length substantially constant, and thereby moving the welding head and the electrode 32 up or down, thus changing the spacing $b$. The member 44 is biased against the upper surface of the workpiece 22, so that the change in the spacing $b$ causes the rack 46 to rotate the gear 48, thus turning the drive shaft 58, the gear 50, the gear 52, and the potentiometer arm 54.

23 — Ronney L. Case — 14833 — Day Pats. — July 13

The potentiometer 57 is provided as a means for manually adjusting the welding current at the operator's position to arrive at a value which will give optimum welding conditions, more particularly to obtain the desired degree of penetration of the weld into the workpiece. The circuits shown in FIGURE 10 provide a feedback system which causes the potentiometer 56 to seek a setting which is at the same potential as the manual setting of the potentiometer 57, so that normally the base and collector electrodes of the transistor 110 are at nearly equal potentials and there is established in known manner by means of the train of transistors 110, 112, a normal value of voltage across the winding or resistor element of the potentiometer 864. With a particular normal setting of the potentiometer 57, the voltage across the potentiometer 864 is for example 18.75 volts in an embodiment which has been built and successfully tested. A portion of this normal voltage is selected manually by means of potentiometer 864 to determine a desired normal value of welding current for any particular job. Whenever the potentials provided by the potentiometer arms 54 and 100 are unequal, the transistor train is actuated in known manner to alter the voltage across the potentiometer 864, in turn to alter the value of the welding current.

While two stages of transistor circuits are shown in FIGURE 10, the number of stages may be varied as required in any given instance, and transistors of PNP and NPN types may be used in any desired combination, in whatever manner necessary to provide a desired range of voltage variation and a desired polarity of voltage in the current demand potentiometer 864. Suitable variations of the transistor circuits will occur to those skilled in the art. Also, other signal translating or amplifying means may be substituted for the transistor train between the potentiometer arms 54 and 100 and the programming means for regulating the power supply source.

It will be understood that the power source 78 may have any suitable voltage current characteristic relationship; for example, constant current over an extended voltage image, and that such a source will have a current demand setting device of some kind which is functionally equivalent to the potentiometer 864 and may be incorporated into the system of the invention in a manner similar to that shown for the potentiometer 864 of FIGURE 10 herein.

In the embodiment illustrated, the shaft 70 is mounted at a fixed height with respect to a table surface 27 upon which the carriage 21 rolls.

Under conditions of an unvarying heat sink, variations in the height of the upper surface of the work with respect to the table surface 27 cause substantially no net change in either the arc length $a$ or the dimension $b$, because the arc voltage control tends to maintain $a$ constant and at the same time causes a rotation of the shaft 58 which is substantially equal in magnitude and opposite in direction to a rotation caused by the accompanying displacement of the sensing device 44, tending to maintain the dimension $b$ constant.

The feedback system is so arranged that when the dimension $b$ is decreased thus turning the potentiometer 56 and unbalancing the potentials at the potentiometer arms 54 and 100 respectively, the voltage across the potentiometer 864 is lowered, thereby decreasing the welding current and accordingly decreasing the heat input into the arc. As a result of this decreased heat input the surface of the weld pool rises, causing the automatic arc voltage control to raise the arc electrode, thereby turning the potentiometer arm 54 in such directions as to restore the potentiometer arm 54 to the original position, and thus to restore the potentiometers 56 and 57 to the original equipotential condition and the welding current to the original value as determined by the manual setting of the potentiometer 864. Likewise, when the dimension $b$ is increased, the welding current is temporarily increased and then the potentiometer arm 54 is again turned in such direction as to restore the potentiometer arms to the equipotential condition and to restore the welding current to the present value. Thus, the excursions of the welding current are executed with reference to the value of welding current preset by means of potentiometer 57 as the normal value.

If the setting of the potentiometer 57 is changed, for example away from the setting corresponding to 18.75 volts across the potentiometer 864 in the example cited, the value of the welding current is changed and the penetration of the weld is changed accordingly. This changes the level of the molten pool and the value of the dimension $b$, driving the potentiometer arm 54 in such direction that the latter tends to seek an equipotential condition as before, but there results a different value of the voltage across the current demand potentiometer 864 and hence a different reference value or normal value of welding current. With a new setting of potentiometer 57, the excursions of the welding current caused by variations in the dimension $b$ are executed with reference to the altered reference value of the welding current. By means of the adjustment provided by the potentiometer 57, welding conditions may be varied as suggested by visual inspection of the work as the welding of a seam progresses. Minor corrections may be effected during a run without such waste as might be occasioned if the run were continued without correction, or a trial run may be made from which a correct setting may be established for subsequent runs under like conditions.

Figure 11:
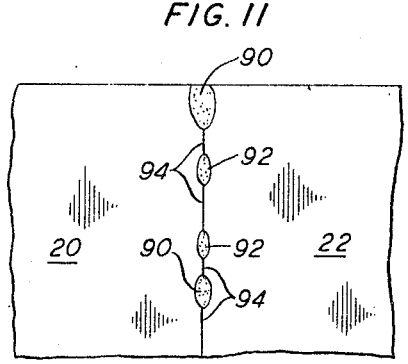
FIGURE 11 is a diagrammatic plan view of the under side of a pair of plates that have been welded together at a butt joint, showing irregular penetration of the weld through the plates, interspersed by regions where the weld has not penetrated to the bottom of the plates.

FIGURE 11 shows diagrammatically one type of appearance of the under side of a seam between two plates for a typical weld for which the arc voltage was automatically controlled but where the welding current was maintained substantially constant. Areas 90 show excessive penetration, while areas 92 show a desired satisfactory depth of penetration. The areas 90, 92, are interspersed with portions 94 of the seam where penetration is incomplete as indicated by a line of abuttment between the plates with no area of weld visible.

Figure 12:
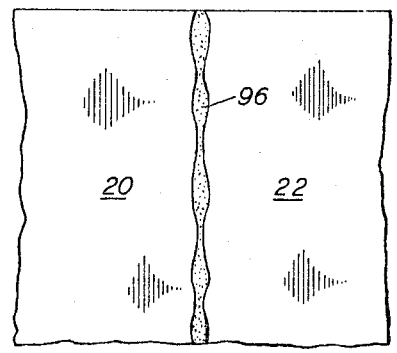
FIGURE 12 is a view similar to that of FIGURE 11 except that there is irregular penetration at all points along the seam.

FIGURE 12 shows diagrammatically another type of the appearance of a weld without the application of the present invention, in which the depth of penetration varies from point to point along the length of the seam as indicated by the area 96 which has wavy edges.

Figure 13:
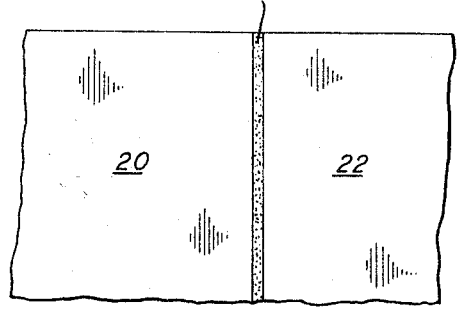
FIGURE 13 is a view similar to that of FIGURE 12 except that there is uniform optimum penetration at all points along the seam.

FIGURE 13 shows diagrammatically the appearance of the under side of a seam obtained by using the present invention with automatic control both of the arc voltage and of the welding current to effect substantially constant depth of penetration. In this case, the weld appears as a narrow strip 98 of substantially constant width along the entire length of the seam, the width of this strip being controlled to an optimum value.

It will be evident that the invention is not limited to maintaining a condition of complete or 100 percent penetration of the weld into or through the work. Any lesser degree of penetration may be maintained, as desired.

The embodiment of the invention described and shown herein is related specifically to the use of nonconsuming metal electrode, shielded with helium or argon gas, in an automatic welding head, the plates to be welded being supported in horizontal position and it is contemplated that filler wire will be fed to the arc to supplement the molten metal of the workpieces to obtain the desired bulk of the weld protruding above the arc surface of the work. The invention is not to be understood to be limited to the arrangement shown but may be applied also to welding with a consumable electrode and to vertical welding or other out of ordinary position welding.

While an illustrative form of apparatus and a method in accordance with the invention have been described and shown herein, it will be understood that numerous changes may be made without departing from the general principles and scope of the invention.

I claim:

1. Apparatus for compensating for variations in weld penetration due to relative movements of the arcing tip of a welding electrode in a welding head and the level of an unfused surface of a workpiece, comprising, in combination, means for continuously sensing the spacing between a fixed point of the welding head and the said unfused surface of the workpiece during the welding of a seam, and means to vary the welding current substantially in direct relationship to sensed variations in said sensed spacing, thereby maintaining substantially constant the depth of penetration of the weld along the length of the seam.

2. Apparatus for controlling depth of penetration of a weld into a workpiece, comprising in combination, a welding head, a welding electrode carried by said welding head, means to supply welding current between said welding electrode and the workpiece, means to maintain a substantially constant spacing between the top surface of the weld pool and the tip of the welding electrode during the welding of a seam, means for continuously sensing the spacing between an unfused top surface of the workpiece in proximity to the welding electrode and a fixed point of the welding head during the welding of the seam, and means to vary the welding current substantially in direct relationship to sensed variations in said sensed spacing, thereby maintaining substantially constant the depth of penetration of the weld along the length of the seam.

3. Apparatus for controlling the depth of penetration of a weld into a workpiece along the length of a seam, comprising, in combination, a welding head, a welding electrode carried by said welding head, means to supply welding current between said welding electrode and the workpiece, means located at the welding head to adjust the normal value of welding current to be supplied by said current supply means, means to maintain a substantially constant spacing between the top surface of the weld pool in the seam and the arcing tip of the welding electrode during the welding of the seam, means for continuously sensing the spacing between an unfused surface of the workpiece in proximity to the welding electrode and a fixed point of the welding head during the welding of the seam, and means to vary the value of the welding current about the said normal value in such sense as to maintain substantially constant the depth of penetration of the weld along the length of the seam.

4. Apparatus for penetration control in a welding operation, comprising in combination, a welding head, means to supply welding current to said welding head, at substantially constant current programmable as to the current value, programming means for controlling the said current value, means to sense the spacing betweeen an unfused surface of a workpiece plate and a fixed point on the welding head, automatic arc voltage control means incidentally operative to change said spacing while maintaining the arc length substantially constant during level changes in the surface of the weld pool thereby tending to cause the depth of penetration of the weld to vary, and means actuated by variations in the said sensed spacing to vary the setting of said programming means, whereby the welding current value is programmed in response to said variations in sensed spacing in such manner as to maintain the depth of penetration of the weld substantially constant.

5. Apparatus for penetration control in a welding operation, comprising, in combination, a welding head, substantially constant current welding power supply means for supplying power to said welding head, said supply means including a potentiometer for setting the value of current supplied by said supply means, a sensing member carried by said welding head and yieldingly pressed against an unfused surface of a workpiece plate in proximity to the welding arc, said sensing member sensing the spacing between said workpiece surface and a fixed point of said welding head, automatic arc voltage control means for regulating the arc length, said arc voltage control means acting with reference to variations in the surface level of the weld pool and thereby acting to vary the said sensed spacing and so tending to cause the depth of penetration of the weld to vary, and means actuated by relative motion of said sensing member and said welding head to vary the setting of said potentiometer, whereby the welding current value is varied in such manner as to maintain the depth of penetration of the weld substantially constant during variations in said sensed spacing.

6. Apparatus according to claim 5, in which the said means for varying the setting of the said potentiometer acts in such manner that an increase in the said sensed spacing results in an increase in the welding current and a decrease in the said spacing results in a decrease in the welding current.

7. The method of maintaining substantially uniform penetration of an electric arc weld along the length of a fused seam, which method comprises maintaining a substantially constant arc voltage while at the same time varying the heat input into the arc in response to variations in the level of the molten weld pool relative to an unfused surface of the work, whereby said variations in heat input substantially compensate for variations in heat sink in thermal relationship with the weld pool.

8. The method of maintaining substantially uniform penetration of an electric arc weld along the length of a fused seam, which method comprises maintaining a substantially constant arc voltage while at the same time varying the arc current in response to variations in the effectiveness of whatever heat sink is withdrawing heat from the weld pool as evidenced by variations in the level of the surface of the weld pool with reference to an unfused work surface adjacent to the weld pool.

9. The method of maintaining substantially uniform penetration of an electric arc weld along the length of a fused seam, which method comprises utilizing variations in the distance of a welding head above an unfused work surface adjacent to the weld pool in response to the action of an automatic arc voltage control device to sense variations in the level of the surface of the weld pool with reference to said unfused work surface, and using the sensed variations to effect compensating variations in heat input to the arc.

10. The method according to claim 9, in which the compensating variations in heat input to the arc are effected by varying the arc current.

11. The method of maintaining substantially uniform penetration of an electric arc weld along the length of a fused seam, which method comprises maintaining a substantially constant arc voltage while at the same time varying the arc current in response to variations in the spacing between an unfused top surface of the workpiece in proximity to the welding electrode and a fixed point of the welding head during the welding of the seam.

12. The method of maintaining substantially uniform penetration of an electric arc weld along the length of a fused seam, which method comprises utilizing the movement of a welding head produced by the response of an automatic arc voltage control device with respect to an unfused top surface of the workpiece in proximity to the weld pool to actuate means to effect variations in the welding current and thereby reduce variations in the level of the surface of the weld pool with reference to said unfused surface.

References Cited by the Examiner

UNITED STATES PATENTS

| | | | |
|---|---|---|---|
| 2,897,341 | 7/1959 | MacKusick | 219—130 |
| 3,135,858 | 6/1964 | Lesnevich | 219—130 |

ANTHONY BARTIS, *Acting Primary Examiner.*

RICHARD M. WOOD, *Examiner.*